US009696987B2

(12) United States Patent
D'Alessandro et al.

(10) Patent No.: US 9,696,987 B2
(45) Date of Patent: *Jul. 4, 2017

(54) COMPLEX COMPUTER ENVIRONMENT INSTALLATION

(71) Applicant: International Business Machines Corporation, Armonk, NY (US)

(72) Inventors: Massimo D'Alessandro, Rome (IT); Arcangelo Di Balsamo, Aprilia (IT); Nicola Milanese, Rome (IT); Sandro Piccinini, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/161,756

(22) Filed: May 23, 2016

(65) Prior Publication Data
US 2016/0266883 A1    Sep. 15, 2016

Related U.S. Application Data

(63) Continuation of application No. 15/161,648, filed on May 23, 2016, which is a continuation of application No. 14/833,168, filed on Aug. 24, 2015, now Pat. No. 9,395,971, which is a continuation of application No. 14/493,927, filed on Sep. 23, 2014, now Pat. No. 9,395,969.

(51) Int. Cl.
*G06F 9/445* (2006.01)
*H04L 29/08* (2006.01)

(52) U.S. Cl.
CPC ............. *G06F 8/65* (2013.01); *G06F 8/61* (2013.01); *H04L 67/10* (2013.01); *H04L 67/34* (2013.01)

(58) Field of Classification Search
None
See application file for complete search history.

(56) References Cited

U.S. PATENT DOCUMENTS

| 5,838,918 | A | 11/1998 | Prager et al. |
| 6,014,686 | A | 1/2000 | Elnozahy et al. |
| 6,138,153 | A | 10/2000 | Collins, III et al. |
| 6,259,448 | B1 | 7/2001 | McNally et al. |
| 6,549,932 | B1 | 4/2003 | McNally et al. |
| 8,412,822 | B1 * | 4/2013 | Weinman, Jr. ........ G06F 9/5027 709/201 |
| 9,081,620 | B1 * | 7/2015 | Chaubal ................ G06F 9/5072 |

(Continued)

OTHER PUBLICATIONS

Appendix P—List of IBM Patents or Patent Applications Treated as Related, 2 Pages.

(Continued)

*Primary Examiner* — Insun Kang
(74) *Attorney, Agent, or Firm* — Alexander G. Jochym

(57) ABSTRACT

An install request including a hierarchy of a complex computer environment is received, wherein the hierarchy comprises a first component needed on the first computer and one or more other components needed in the complex computer environment. One or more other computers on which to install the one or more components is determined. Responsive to determining the one or more other computer on which to install the one or more other components, installation of the one or more other components on the one or more other computers is initiated.

5 Claims, 3 Drawing Sheets

(56) References Cited

U.S. PATENT DOCUMENTS

| | | | |
|---|---|---|---|
| 9,262,144 B1* | 2/2016 | Apte | G06F 8/60 |
| 2006/0173984 A1* | 8/2006 | Emeis | G06F 9/5072 |
| | | | 709/223 |
| 2007/0169049 A1* | 7/2007 | Gingell | G06F 8/63 |
| | | | 717/151 |
| 2012/0233299 A1 | 9/2012 | Attanasio et al. | |
| 2013/0326494 A1* | 12/2013 | Nunez | H04L 41/082 |
| | | | 717/172 |
| 2014/0053072 A1 | 2/2014 | Guo et al. | |
| 2014/0215035 A1* | 7/2014 | Anderson | G06F 9/5088 |
| | | | 709/223 |
| 2015/0277969 A1* | 10/2015 | Strauss | G06F 9/467 |
| | | | 707/703 |

OTHER PUBLICATIONS

Buecker et al.; "Endpoint Security and Compliance Management Design Guide Using IBM Tivoli Endpoint Manager"; IBM Tivoli, Redbooks, IBM International Technical Support Organization; Aug. 2012; Copyright International Business Machines Corporation 2012, All Rights Reserved.

D'Alessandro et al., "Complex Computer Environment Installation," U.S. Appl. No. 14/493,927, filed Sep. 23, 2014, 28 pages.

D'Alessandro et al., "Complex Computer Environment Installation," U.S. Appl. No. 14/833,168, filed Aug. 24, 2015, 23 pages.

D'Alessandro et al., "Complex Computer Environment Installation," U.S. Appl. No. 15/161,648, filed May 23, 2016, 23 pages.

Goldszmidt, German S.; "Distributed Management by Delegation"; Submitted in partial fulfillment of the requirements for the degree of Doctor of Philosophy in the Graduate School of Arts and Sciences; Columbia University; 1996; Copyright 1996 German S. Goldszmidt, All Rights Reserved.

\* cited by examiner

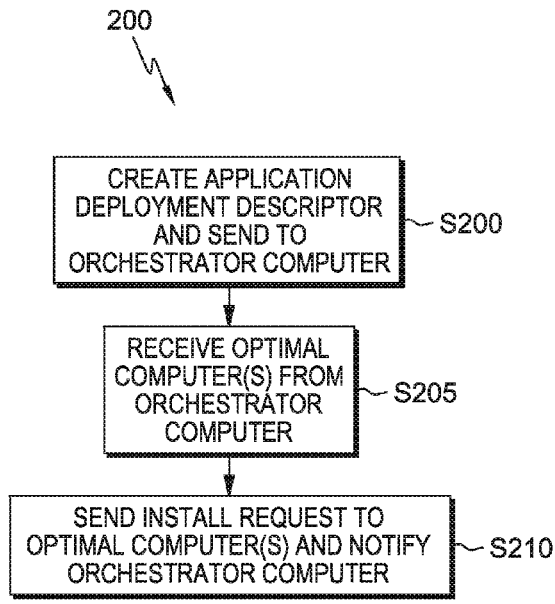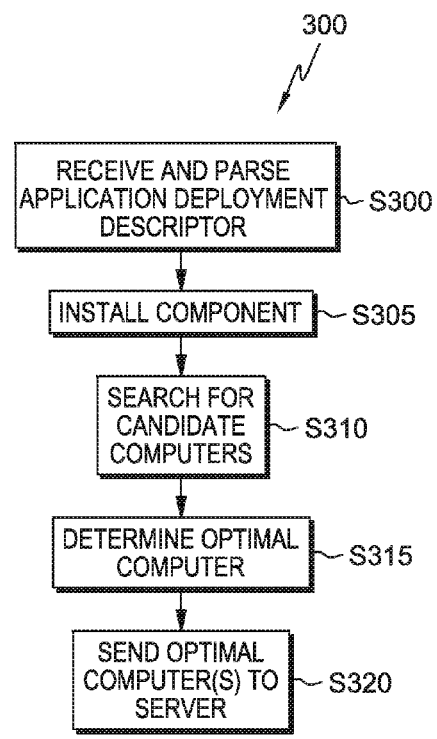
FIG. 2
FIG. 3

COMPLEX COMPUTER ENVIRONMENT INSTALLATION

BACKGROUND OF THE INVENTION

The present invention relates generally to the field of complex computer environments, and more particularly to the installation and configuration of a complex computer environment.

A complex computer environment is used in computer clustering, grid computing, peer-to-peer computing/networking, traditional client-server models, and other computer systems requiring the use of multiple computers with components of the complex computer environment running on each computer. A complex computer environment consists of a set of loosely connected or tightly connected computers that work alone, together, or in a hybrid of both so that in many respects all of the computers can be viewed as a single system. The components of a complex computer environment are usually connected to each other through fast local area networks, with each node (computer) running its own instance of an operating system.

In order to install and configure a complex computer environment, a user must set up a client server to distribute the architecture of the complex computer environment. The user must execute multiple manual steps or at the very best trigger some automatic steps. Each of the proper computers need to be identified. Then the installation of the components need to be accomplished on each identified computer. Finally, the components and computers must be configured to have the complex computer environment working in the right way. Generally, this can be done by manually installing the components on each computer individually or by a client server that runs the installation.

SUMMARY

Embodiments of the present invention include a method, computer program product, and system for installing a complex computer environment. In one embodiment, an install request including a hierarchy of a complex computer environment is received, wherein the hierarchy comprises a first component needed on the first computer and one or more other components needed in the complex computer environment. One or more other computers on which to install the one or more other components is determined. Responsive to determining the one or more other computers on which to install the one or more other components, installation of the one or more other components on the one or more other computers is initiated.

BRIEF DESCRIPTION OF THE DRAWINGS

FIG. 2 is a flowchart depicting operational steps of a program for installing a complex computer environment, in accordance with an embodiment of the present invention;

FIG. 3 is a flowchart depicting operational steps of a program for installing a complex computer environment, in accordance with an embodiment of the present invention.

DETAILED DESCRIPTION

Embodiments of the present invention allow for the installation and configuration of a complex computer environment. An application deployment descriptor is created that describes the components of the complex computer environment, the hierarchy of the components, policy rules of the complex computer environment, and the component to be installed on a first computer of the complex computer environment. In an embodiment, the component may be a piece of middleware (i.e. a server, gateway, agents, etc.) or maybe be an application (i.e. database, chat services, etc.). The application deployment descriptor is communicated to the orchestrator computer that is the first piece of the complex computer environment. The orchestrator computer now runs the installation of the complex computer environment the orchestrator computer is a part of, including finding potential computers to fulfill the needs of the complex computer environment and determining which of said potential computers are the most optimal to have the remaining components of the complex computer environment installed on them.

Some embodiments of the present invention recognize that by using an orchestrator computer that is part of the complex computer environment to determine optimal computers to create the complex computer environment, the orchestrator computer can create a complex computer environment with optimal infrastructure and workload constraints. The installation and configuration process, at least in part, is completed by an orchestrator computer that is part of the complex computer environment instead of putting the workload and installation upon a central computer that may be handling the installation of multiple complex computer environments simultaneously. Additionally, the orchestrator computer has a better understanding of how the components and computers will interact, via a peer to peer approach, wherein the orchestrator computer communicates directly with potential computers, as opposed to a central computer.

Figure 1:
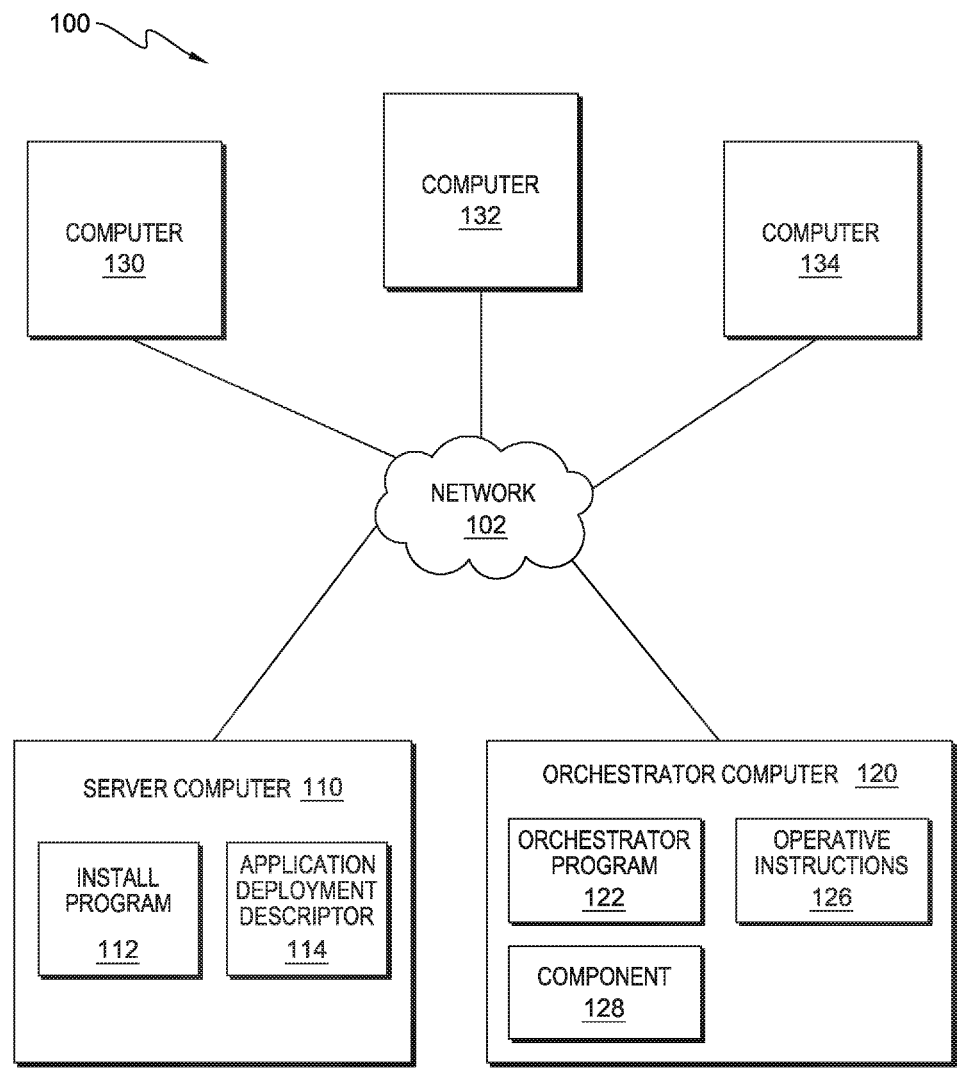
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes server computer 110, orchestrator computer 120, and computer 130, 132, and 134, all interconnected over network 102. Data processing environment 100 can include additional server computers (not shown), orchestrator computers (not shown), or computers (not shown). In one embodiment, server computer 110, orchestrator computer 120, and computer 130, 132, and 134 communicate through network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between server computer 110, orchestrator computer 120, and computer 130, 132, and 134, in accordance with embodiments of the present invention.

In example embodiments, server computer 110, orchestrator computer 120, and computer 130, 132, and 134 may each be a laptop, tablet, or netbook personal computer (PC), a desktop computer, a personal digital assistant (PDA), a smart phone, or any programmable electronic device capable of communicating with any computing device within data processing environment 100. In certain embodiments, server computer 110, orchestrator computer 120, and computer 130, 132, and 134 collectively represent a computer system utilizing clustered computers and components (e.g., database server computers, application server computers, etc.) that act as a single pool of seamless resources when accessed by elements of data processing environment 100, such as in a cloud computing environment. In general, server computer 110, orchestrator computer 120, and computer 130, 132, and 134 are each representative of any electronic device or combination of electronic devices capable of executing computer readable program instructions. Server computer 110, orchestrator computer 120, and computer 130, 132, and 134 may each include components as depicted and described in further detail with respect to FIG. 4, in accordance with embodiments of the present invention.

Server computer 110 includes install program 112 and application deployment descriptor 114. Install program 112 is a program, application, or subprogram of a larger program that initiates and performs parts of installation of a complex computer environment. Application deployment descriptor 114 will contain the operative instructions 126 and at least one component 128.

Install program 112 creates application deployment descriptor 114, determines orchestrator computer 120, and notifies orchestrator computer 120 or any other computer 130 of an install request. Install program 112 receives instructions from a user via a user interface (not shown). In an alternative embodiment, install program 112 receives instructions from another program. Install program 112 receives instructions related to a complex computer environment that is to be installed on two or more computers. The instructions received include a list of the plurality of components in the complex computer environment and the hierarchy of said components. In an embodiment, the components may need to be installed in a particular order, for example, a certain component may need to be installed first and therefore that component must be installed on orchestrator computer 120 prior to other components. Additionally certain components may be required to communicate directly with other components so their computers must be connected to each other directly. Additionally, the instructions received may include policy rules for the complex installation such as network connectivity/segregation, data transfer speed, firewall settings, Operating System "OS", computer resources (RAM, CPU, disk space available, etc.), etc. The policy rules, in general, are requirements that the computer(s) must have and will help orchestrator program 112 to narrow down potential computer(s) (e.g., computer 130, 132, and/or 134) that will be candidates for the complex computer environment. In an embodiment, the policy rules are requirements for all components and corresponding computers of the complex computer environment. In an alternative embodiment, there are individual policy rules for each component and corresponding computer of the complex computer environment.

A user interface is a program that provides an interface between a user and install program 112. A user interface refers to the information (such as graphic, text, and sound) a program present to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

From the received instructions, install program 112 creates application deployment descriptor 114 that includes the above referenced received instructions. In an embodiment, these above referenced instructions are referred to as operative instructions 126. For example, application deployment descriptor 114 may include information that the complex computer environment consists of four computers (not shown). Computer #1 must be connected to Computer #2. Computer #2 must be connected to Computer #3 and Computer #4. Additionally, application deployment descriptor 114 includes information about component 128 that will be installed on orchestrator computer 120 when server computer 110 distributes application deployment descriptor 114 to operator computer 120.

Orchestrator computer 120 includes orchestrator program 122, operative instructions 126 and component 128. Orchestrator program 122 is a program, application, or subprogram of a larger program that performs parts of the installation of a complex computer environment including locating and determining optimal computer(s) to connect with orchestrator computer 120 and make install requests of components on determined optimal computers. Additionally, orchestrator program 122 notifies install program 112 of the optimal computers to complete parts of the installation of the complex computer environment. In an embodiment, upon determining that a computer will have the first component of a complex computer environment installed on it and that said computer will be the orchestrator of the installation of the complex computer environment, orchestrator program 122 will be installed on orchestrator computer 120. In an alternative embodiment, orchestrator program 122 can be included in application deployment descriptor 114 when server computer 110 communicates application deployment descriptor 114 to orchestrator computer 120. In yet another embodiment, application deployment descriptor 114 can include information on a location orchestrator computer 120 can go to locate and download orchestrator program 122 for installing on orchestrator computer 120.

As discussed previously, operative instructions 126 include, for example, a list of components in the complex computer environment, a hierarchy for said components, policy rules for the complex installation, and computer selection characteristics for determining optimal computer (s) for the installation. Component 128 is a data file(s) that is used to install said component on orchestrator computer 120. For example, component 128 may be the data file(s) for installing a server component, agent component, interface component, etc. In an alternative embodiment, component 128 may not be sent to orchestrator computer 120 within application deployment descriptor 114, however, operative instructions 126 may include information about the location to find, download, and/or receive component and orchestrator computer 120 can act upon said instructions to install component 128.

Computer 130, 132, and 134 are computers that may have a component (not shown) installed on them, initially or by request of orchestrator program 122, and be connected to the complex computer environment orchestrator program 122 is creating. In an alternative embodiment, any computer accessible via network 102, but not shown, may be connected to the complex computer environment orchestrator program 122 is creating.

FIG. 2 is a flowchart of workflow 200 depicting operational steps for initiating and performing parts of the installation of a complex computer environment, in accordance with an embodiment of the present invention. In one embodiment, the steps of the workflow are performed by install program 112. Alternatively, the steps of the workflow can be performed by orchestrator program 122 or by both programs. In a preferred embodiment, a user, via a user interface discussed previously, can invoke workflow 200 upon determining that they would like to install a complex computer environment. In an alternative embodiment, workflow 200 can be invoked automatically under the control of another program, for example, upon the user creating a complex computer environment using another program and said program may indicate to install program 112 to begin a step in workflow 200.

Install program 112 creates application deployment descriptor 114 and communicates application deployment descriptor 114 to orchestrator computer 120 (step S200). As discussed previously, application deployment descriptor 114 includes operative instructions 126 (not shown) and component 128 (not shown). Operative instructions 126 include a list of components to be included in the complex computer environment, a hierarchy for said components, policy rules for the complex computer environment installation, and computer selection characteristics for determining optimal computer(s). In an embodiment, each component will be installed on a separate computer. In an alternative embodiment, one or more components may be installed on the same computer. In an embodiment, the hierarchy for said components includes at least one of an install order for the components, a communication structure for the component(s)/computer(s) (e.g., computer #1 is connected to computer #2 and computer #2 is connected to computer #3 and computer #4), and the component to be installed on orchestrator computer 120. Component 128 is a data file(s) that is used to install said component 128 on orchestrator computer 120. For example, component 128 may be the data file(s) for installing a server component, agent component, interface component, etc. In an alternative embodiment, component 128 may not be sent to orchestrator computer 120 within application deployment descriptor 114, however, operative instructions 126 may include information about the location to find, download, and/or receive component 128 and orchestrator computer 120 can act upon the operative instructions 126 to install component 128. Policy rules for the for the complex computer environment installation, discussed previously, are also included in application deployment descriptor 114. Once application deployment descriptor 114 is created, install program 112 communicates application deployment descriptor 114 to orchestrator computer 120.

Install program 112 receives optimal computer(s) from orchestrator computer 120 (step S205). As will be discussed, orchestrator program 122, located on orchestrator computer 120, will communicate a determined optimal computer to have components installed on them to create a complex computer environment to server computer 110. Install program 112 receives the information about the optimal computer(s). Install program 112 then locates the optimal computer(s). Additionally, install program 112 locates component information for each part of the complex computer environment pieces that will be sent to the optimal computer(s).

Install program 112 sends an install request to the optimal computer(s) and notifies orchestrator computer 120 (step S210). In an embodiment, install program 112, after locating the component(s) that will be installed on each optimal computer(s), sends each component to the proper optimal computer. Additionally, install program 112 will notify each optimal computer of the computer they are supposed to connect with to create the complex computer environment along with orchestrator computer 120. In an embodiment, each optimal computer will connect directly with orchestrator computer 120. In an alternative embodiment, each optimal computer can connect to each other optimal computer or to network 102 to eventually connect to orchestrator computer 120.

FIG. 3 is a flowchart of workflow 300 depicting operational steps for performing parts of the installation of a complex computer environment including locating and determining optimal computer(s) to connect with orchestrator computer 120 and make install requests of components on determined optimal computers or notify install program 112 of the optimal computers to complete parts of the installation of the complex computer environment. The steps of the workflow are performed by orchestrator program 122. In a preferred embodiment, install program 112 invokes workflow 300 upon determining a complex computer environment to install. In an alternative embodiment, workflow 300 can be invoked automatically under the control of another program, for example, upon the user creating a complex system using another program and said program may indicate to orchestrator program 122 to begin a step in workflow 300.

Orchestrator program 122 receives and parses application deployment descriptor 114 (step S300). As discussed previously, application deployment descriptor 114 includes operative instructions 126 and component 128. Orchestrator program 122, after receiving application deployment descriptor 114, parses application deployment descriptor 114 into operative instructions 126 and component 128.

Orchestrator program 122 installs component 128 (step S305). As discussed previously, component 128 is a data file(s) that is used to install said component 128 on orchestrator computer 120. For example, component 128 may be the data file(s) for installing a server component, agent component, interface component, etc., and orchestrator program 112 will install component 128 on orchestrator computer 120. In an alternative embodiment, component 128 may not be sent to orchestrator computer 120 within application deployment descriptor 114, however, operative instructions 126 may include information about the location to find, download, and/or receive component. Orchestrator program 122 will find, download, and/or receive component 128 and install component 128 on orchestrator computer 120.

Orchestrator program 112 searches for candidate computer(s) (step S310). In an embodiment, orchestrator program 112, using a collaborative peer to peer approach, searches for a candidate computer(s) to install each of the remaining components of the complex computer environment upon. In an alternative embodiment, one or more components may be installed on a single computer. Orchestrator program 112 will search for any computers that are connected to orchestrator computer 120 via network 102. The policy rules in application deployment descriptor 114, discussed previously, determine the computer(s) that orchestrator program 112 searches for. For example, the policy rules indicate that the all computers must be running on the same OS and therefore orchestrator program 112 will only search for computers operating with said system.

Additionally, orchestrator program 112 may search for computers that are found on the same network as orchestrator computer 120. For example, computer #1, computer #2, and computer #3 are all connected via the network. However, computer #1 and computer #2 are on network "exampleA" and computer #3 is on network "exampleB." Therefore, orchestrator program 112 would disregard computer #3 but would consider computer #1 and computer #2 as potential computers to have components of the complex computer environment installed on them. Alternatively, orchestrator program 112 may search for computers that are not on the same network (e.g., if computers need to be on separate networks for security reasons). Orchestrator program 112 may also search for a group of computers that are on the same network, to fulfill part of the complex computer environment, and then a group of computer not on the same network, to full another part of the complex computer environment. In an alternative embodiment, orchestrator program 112 may search for computers that have at least a minimum data transfer speed between said computers, the firewall settings of the computers, or any other requirement found in the policy rules. In yet another alternative embodiment, certain characteristics of the computer(s) may be modified or changed (i.e., the computer(s) may indicate to orchestrator computer 112 that they are capable of changing their OS or firewall settings to meet the requirements of the complex computer environment), and orchestrator program 112 will take the information into account when determining whether the computer(s) are optimal for having the components of the complex computer environment installed on them.

Upon finding computer(s) that meet the policy rules of the complex computer environment, orchestrator program 112 determines certain computer selection characteristics, found in operative instructions 126. The computer selection characteristics are used to determine an optimal computer(s) when two or more computers fulfill the policy requirements for the installation of the component on that specific computer in the complex computer environment. For example, orchestrator program 112 will determine the data transfer speed of the computer when it communicates with the computer(s) that are connected to it in the complex computer environment, as found in the hierarchy of the complex computer environment. Additionally, orchestrator program 112 may determine and record the memory speed and size, persistent storage size, type of persistent storage device, read/write speed of persistent storage, processor speed, video graphics specifications, or any other characteristic of the computer(s) that may be utilized the component installed on the computer(s) to create the complex computer environment. Orchestrator program 112 may also determine software already running locally on computer(s), software that can be installed on computer(s), and any specific software that may be restricted from being installed on computer(s). In an embodiment, the computer selection characteristics are for all components and corresponding computers of the complex computer environment. In an alternative embodiment, there are computer selection characteristics for each component and corresponding computer of the complex computer environment.

Orchestrator program 122 determines at least one optimal computer upon which to install a component of the complex computer environment(step S315). Orchestrator program 112 uses the computer selection characteristics determined in the previous step (see S310) along with information found about computer(s) 130, 132, 134, when trying to comply with the policy rules to determine an optimal computer. Orchestrator program 112 performs this step for each component, and therefore a computer for each component to be installed on, in the complex computer environment. In an embodiment, operative instructions 126 include an order that orchestrator program 112 should determine the optimal computers. For example, if a server component, agent component, interface component need to be installed on their own computers and then connected to component 128 on orchestrator computer 120, operative instructions 126 can indicate that an optimal computer for server component should be determined first, then agent component, and finally interface component. Alternatively, orchestrator program 112 can have a preset order to determine optimal computers to install components of a complex computer environment that is determined by user input or based upon best found results in creating previous complex computer environment using orchestrator program 112.

Orchestrator program 122 queries two or more computers for each component of the complex computer environment. For each of the two or more computers, orchestrator program 122 determines a confidence factor based on the computer selection characteristics. For example, orchestrator program 122 is determining the optimal computer for ComponentA. Orchestrator program 122, after narrowing down potential computers using the policy rules found in operative instructions 126, determines four computers as potential computers for the install of ComponentA. The policy rules require that the computer is using OS "Example", the computer is located on "networkA" which is the network that orchestrator computer 120 is located, and that the computer and orchestrator computer 120 have a data transfer speed of at least 2 mB/s between themselves. Orchestrator program 122 determines that computerA, computerB, and computerC fulfill the policy rules. Orchestrator program 122 determines the computer selection characteristics found in operative instructions 126.

In the example, orchestrator program 122 determines from operative instructions 126 that the computer selection characteristics for ComponentA are memory size, processor speed, and data transfer speed. The minimum requirements for memory size are 1 GB and the maximum requirement is 4 GB. The minimum requirements for processor speed is 1.8 mHz and the maximum requirement is 3.0 mHz. The minimum requirements for data transfer speed, discussed previously, is 2 mB/s and the maximum requirement is 4.0 mB/s. ComputerA has the following: 2 Gigabyte (GB) memory, 2.4 mHz processor speed, and a 2.5 mB/s data transfer speed with orchestrator computer 120. ComputerB has the following: 4 Gigabyte (GB) memory, 2.8 mHz processor speed, and a 2.0 mB/s data transfer speed with orchestrator computer 120. ComputerC has the following: 2 Gigabyte (GB) memory, 2.2 mHz processor speed, and a 4.0 mB/s data transfer speed with orchestrator computer 120. The operative instructions 126 indicate that memory size is 25% of the confidence factor, processor speed is 35% of the confidence factor, and data transfer speed with orchestrator computer 120 is 40% of the confidence factor. The minimum requirements are assigned a factor of zero and the maximum requirements are assigned a factor of one and the factor is scaled between the minimum and maximum. Any values over the maximum are assigned a factor of one.

ComputerA's confidence factor is 0.3583 (or 35.83%). ComputerA's confidence factor is calculated by the following operation: $[((2-1)/3)*0.25]+[((2.4-1.8)/1.2)*0.35]+[((2.5-2)/2)*0.4]$. ComputerB's confidence factor is 0.5417 (or 54.17%). ComputerB's confidence factor is calculated by the following operation: $[((4-1)/3)*0.25]+[((2.8-1.8)/1.2)*0.35]+[((2-2)/2)*0.4]$. ComputerC's confidence factor is 0.60 (or 60.00%). ComputerC's confidence factor is calculated by the following operation: $[((2-1)/3)*0.25]+[((2.2-1.8)/1.2)*0.35]+[((4-2)/2)*0.4]$. In this embodiment, the computer with the higher confidence factor is the more optimal computer.

Orchestrator program 122 communicates the optimal computers to server computer 110 (step S320). Orchestrator program 122 notifies server computer 110 of the determined optimal computers to complete the complex computer environment and install program 112 performs step S205 and S210.

In an alternative embodiment, steps S205 and S210 can be performed by orchestrator program 122 after the completion of step S315 by orchestrator program. Orchestrator program 122 will send the install requests directly to the optimal computers and complete the installation of the complex computer environment.

In an embodiment, orchestrator program 122 will determine two or more optimal computers for at least one of the components of the complex computer environment. Upon completion of the setup of the complex computer environment, orchestrator program 122 or a program internal to one of the computers found in the complex computer environment, will determine if the complex computer environment is setup properly and each of the components is performing as required. If a component found on one of the computers of the complex computer environment is not performing to requirements, orchestrator program 122 can remove that computer from the complex computer environment and replace the computer with a new computer that was also an optimal computer but not the most optimal computer until the complex computer environment is performing as needed.

Figure 4:
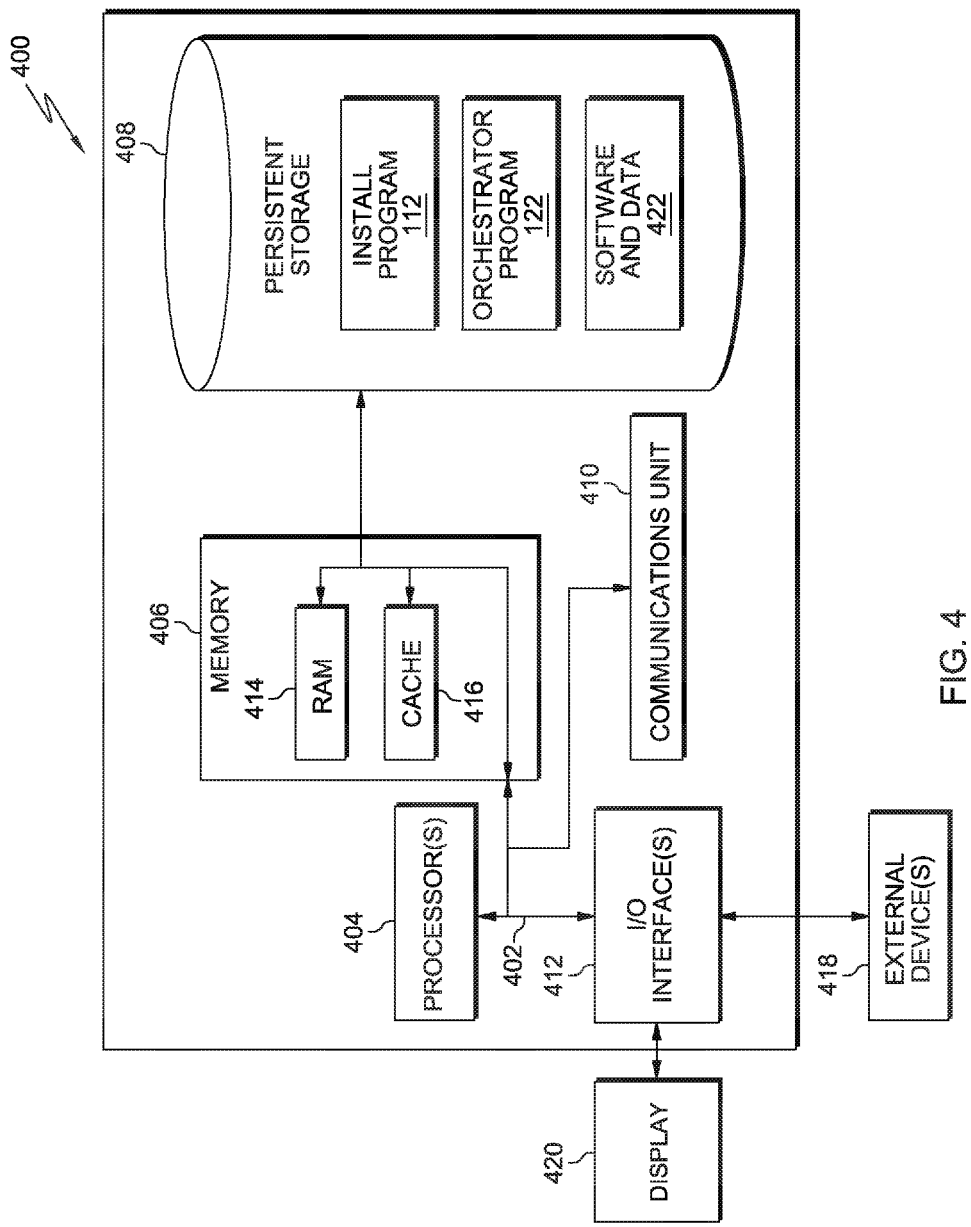
FIG. 4 depicts a block diagram of components of a computing system representative of the server computer and orchestrator computer of FIG. 1, in accordance with an embodiment of the present invention.

FIG. 4 depicts a block diagram of components of server computer 110 or orchestrator computer 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processors 404 via one or more memories of memory 406. With respect to server computer 110 and orchestrator computer 120, software and data 422 includes install program 112, application deployment descriptor 114, orchestrator program 122, operative instructions 126 and component 128.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 may include one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., install program 112 and orchestrator program 122, can be stored on such portable computer readable storage media and can be loaded onto persistent storage 408 via I/O interface(s) 412. I/O interface(s) 412 also can connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for installing a complex computer environment, the method comprising:
    receiving, by a first computer, an install request including a hierarchy of a complex computer environment, wherein the hierarchy comprises a first component needed on the first computer and one or more other components needed in the complex computer environment, wherein the first component is determined to be installed on the first computer prior to the one or more other components;

determining, by the first computer, one or more other computers of the complex computer environment on which to install the one or more other components upon determining a confidence factor based on characteristics of each computer of the one or more other computers;

responsive to determining the one or more other computers on which to install the one or more other components, initiating, by the first computer, installation of the one or more other components on the one or more other computers;

determining that one of the one or more other components installed on the one or more other computers is performing below requirements;

responsive to determining one of the one or more other components installed on a second computer of the one or more other computers is performing below requirements, removing the second computer from the complex computer environment and determining, by the first computer, a third computer of the one or more other computers on which to install the component that is performing below requirements; and responsive to determining the third computer of the one or more other computers on which to install the component that is performing below requirements, initiating, by the first computer, installation of the component on the third computer of the one or more other computers.

2. The method of claim 1, wherein determining, by the first computer, one or more other computers on which to install the one or more other components comprises:

determining, by the first computer, characteristics of each computer of a plurality of candidate computers, wherein the characteristics include one or more of the following: network connectivity, network segregation, data transfer speed, firewall settings, operating system, computer memory resources, computer persistent storage resources, video graphics resources, processor resources, and software installed on the computer; and determining, by the first computer, one or more other computers from the plurality of candidate computers on which to install the one or more other components based on the characteristics of each computer of the plurality of computers.

3. The method of claim 2, wherein each individual component of the one or more other components has individual requirements for characteristics of a suitable candidate computer for installation.

4. The method of claim 3, wherein determining, by the first computer, one or more other computers from the plurality of candidate computers on which to install the one or more other components based on the characteristics of the plurality of computers comprises:

determining, for each component of the one or more other components,
   a candidate computer of the plurality of candidate computers that has characteristics that meet the individual requirements of that component.

5. The method of claim 1, wherein the first component and one or more other components are software.

* * * * *